(12) United States Patent
Mizuno et al.

(10) Patent No.: US 10,819,094 B2
(45) Date of Patent: Oct. 27, 2020

(54) PROTECTOR-EQUIPPED ELECTRIC WIRE AND PROTECTOR-EQUIPPED WIRE ARRANGEMENT STRUCTURE

(71) Applicants: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

(72) Inventors: Housei Mizuno, Mie (JP); Yasuyuki Yamamoto, Mie (JP); Shinya Sadohara, Mie (JP); Kousei Nogami, Mie (JP); Makoto Iwata, Mie (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 235 days.

(21) Appl. No.: 16/071,749

(22) PCT Filed: Jan. 23, 2017

(86) PCT No.: PCT/JP2017/002084
§ 371 (c)(1),
(2) Date: Jul. 20, 2018

(87) PCT Pub. No.: WO2017/130891
PCT Pub. Date: Aug. 3, 2017

(65) Prior Publication Data
US 2019/0036311 A1    Jan. 31, 2019

(30) Foreign Application Priority Data

Jan. 28, 2016  (JP) .................................. 2016-013935

(51) Int. Cl.
*H02G 3/04* (2006.01)
*B60R 16/02* (2006.01)

(52) U.S. Cl.
CPC ....... *H02G 3/0406* (2013.01); *B60R 16/0215* (2013.01); *H02G 3/0418* (2013.01); *H02G 3/0437* (2013.01)

(58) Field of Classification Search
CPC ...... H02G 3/04; H02G 3/0462; H02G 3/0487; H02G 3/0406; H02G 3/0418;
(Continued)

(56) References Cited

U.S. PATENT DOCUMENTS 6,875,916 B2 *   4/2005   Winkelbach .............. B64C 1/18
174/482

FOREIGN PATENT DOCUMENTS

| JP | 09-247820 | 9/1997 |
| JP | 2003-274534 | 9/2003 |

(Continued)

OTHER PUBLICATIONS

Official Communication issued in International Bureau of WIPO Patent Application No. PCT/2017/002084, dated Feb. 21, 2017.

*Primary Examiner* — Angel R Estrada
(74) *Attorney, Agent, or Firm* — Greenblum & Bernstein, P.L.C.

(57) ABSTRACT

A protector made of a hollow plate material is externally fitted to an electric wire arranged at a position at which a load is exerted. A protector-equipped electric wire is provided with an electric wire arranged at a position at which a load is exerted, and a protector externally fitted to the electric wire. The protector is made of a folded hollow plate material, the hollow plate material including a plurality of plate-shaped portions, and interposed portions that are arranged extending in one direction between the plurality of
(Continued)

plate-shaped portions and form hollow spaces between the plurality of plate-shaped portions, the protector including a plurality of wall portions that covers the electric wire. The plurality of wall portions including at least one load bearing wall portion that is arranged so that the direction in which the interposed portions extend corresponds to a direction in which the load is exerted.

8 Claims, 8 Drawing Sheets

(58) Field of Classification Search
CPC ........ H02G 3/0437; H02G 3/263; H02G 3/38; H02G 3/22; B60R 16/0215; H01B 7/0045
USPC .................. 174/135, 68.1, 68.3, 70 C, 70 R; 248/74.1, 74.2, 68.4, 49
See application file for complete search history.

(56) References Cited

FOREIGN PATENT DOCUMENTS

| | | |
|---|---|---|
| JP | 2011-091905 | 5/2011 |
| JP | 2013-169803 | 9/2013 |
| JP | 2014-100013 | 5/2014 |
| JP | 2014-117099 | 6/2014 |
| JP | 2015-047057 | 3/2015 |
| JP | 2015-162915 | 9/2015 |

* cited by examiner

PROTECTOR-EQUIPPED ELECTRIC WIRE AND PROTECTOR-EQUIPPED WIRE ARRANGEMENT STRUCTURE

TECHNICAL FIELD

The present invention relates to a protector attached to an electric wire.

BACKGROUND ART

Patent Document 1 discloses the use of a plastic cardboard sheet as a wire support member for supporting a bundle of electric wires that are linearly laid out in a linear fashion in accordance with an arrangement path, the plastic cardboard sheet being cut such that its hollow portions extend in the same direction as a direction in which the arrangement path extends.

Wire harnesses installed in vehicles include an electric wire that is arranged at a position on which the load of a person, baggage or the like is exerted. Such an electric wire typically has a portion that extends in a direction intersecting with the direction in which the load is exerted.

CITATION LIST

Patent Document

Patent Document 1: JP 2014-117099A

SUMMARY OF INVENTION

Technical Problem

However, when the wire harness disclosed in Patent Document 1 is used at a position at which a load is exerted as described above, the direction in which the hollow portions extend is set to a direction that intersects with the direction in which the load is exerted, and thus there is the risk that the load cannot be supported sufficiently.

Accordingly, it is an object of the present invention to provide a technique for making a protector that is made of a hollow plate material and is externally fitted to an electric wire arranged at a position at which a load is exerted less likely to be crushed.

Solution to Problem

In order to solve the above-described problem, a protector-equipped electric wire according to a first aspect includes: an electric wire arranged at a position at which a load is exerted; and a protector externally fitted to the electric wire, wherein the protector is made of a folded hollow plate material, the hollow plate material including a plurality of plate-shaped portions and interposed portions that are arranged extending in one direction between the plurality of plate-shaped portions and form hollow spaces between the plurality of plate-shaped portions, the protector including a plurality of wall portions that covers the electric wire, and the plurality of wall portions includes at least one load bearing wall portion that is arranged so that the direction in which the interposed portions extend corresponds to a direction containing a direction in which the load is exerted. The protector is tubular, and is provided with a locked portion capable of engaging with a locking portion that protrudes from a counterpart member provided at a position at which the protector is arranged.

A protector-equipped electric wire according to a second aspect relates to the protector-equipped electric wire according to the first aspect, wherein the plurality of wall portions includes at least one load bearing wall portion.

A protector-equipped electric wire according to a third aspect relates to the protector-equipped electric wire according to the second aspect, wherein the protector has the shape of a triangular tube.

A protector-equipped electric wire according to a fourth aspect relates to the protector-equipped electric wire according to any one of the first to third aspects, wherein the load bearing wall portion is provided with a first locked portion capable of engaging with a first locking portion that protrudes at a position at which the protector is arranged, and the first locked portion can engage with the first locking portion so that the load bearing wall portion is supported by the first locking portion in the direction in which the load is exerted.

A protector-equipped electric wire according to a fifth aspect relates to the protector-equipped electric wire according to the fourth aspect, wherein the first locked portion includes a catching portion in which a locking claw of the first locking portion is caught on the load bearing wall portion in the direction in which the interposed portions extend, and extends across the direction in which the interposed portions extend.

A protector-equipped electric wire according to a sixth aspect relates to the protector-equipped electric wire according to the fourth or fifth aspect, wherein the protector is provided with a second locked portion located on a side opposite to the first locked portion with the electric wire interposed between the first locked portion and the second locked portion, and the second locked portion is capable of engaging with a second locking portion that protrudes at a position at which the protector is arranged and can sandwich the protector together with the first locking portion.

A protector-equipped electric wire according to a seventh aspect relates to the protector-equipped electric wire according to any one of the first to sixth aspects, wherein the load bearing wall portion includes a vertical wall portion that is arranged so that the direction in which the interposed portions extend matches the direction in which the load is exerted.

A protector-equipped electric wire according to an eighth aspect relates to the protector-equipped electric wire according to any one of the first to seventh aspects, wherein the load bearing wall portion includes a portion in which the hollow plate material is doubled.

A protector-equipped wire arrangement structure according to a ninth aspect relates to a protector-equipped wire arrangement structure in which a protector-equipped electric wire including an electric wire and a protector externally fitted to the electric wire is arranged at a position at which a load is exerted, wherein the protector is made of a folded hollow plate material, the hollow plate material including a plurality of plate-shaped portions and interposed portions that are arranged extending in one direction between the plurality of plate-shaped portions and form hollow spaces between the plurality of plate-shaped portions, the protector including a plurality of wall portions that covers the electric wire, and the plurality of wall portions includes at least one load bearing wall portion that is arranged so that the direction in which the interposed portions extend corresponds to a direction containing a direction in which the load is exerted. The protector is tubular, and is provided with a locked portion capable of engaging with a locking portion that protrudes from a counterpart member provided at a position at which the protector is arranged.

Advantageous Effects of Invention

According to the first to eighth aspects, the load bearing wall portion is arranged so that the direction in which the interposed portions extend corresponds to a direction containing a direction in which a load is exerted, and thus even if a load is exerted, the load bearing wall portion is less likely to be crushed, thus making the protector less likely to be crushed.

Particularly, according to the second aspect, it is possible to support a load with at least one load bearing wall portion.

Particularly, according to the third aspect, the protector has the shape of a triangular tube, and thus even if a load is exerted thereon, such deformation that the load bearing wall portion is rotated is less likely to occur, thus making the protector less likely to be crushed.

Particularly, according to the fourth aspect, as a result of the first locking portion and the first locked portion engaging with each other, the load bearing wall portion is supported by the first locking portion. Accordingly, even if a load is exerted, the load bearing wall portion is even less likely to be crushed.

Particularly, according to the fifth aspect, the first locked portion includes a catching portion in which a locking claw of the first locking portion is caught on the load bearing wall portion in the direction in which the interposed portions extend, and extends across the direction in which the interposed portions extend, and thus the protector is less likely to deform even if the first locking portion and the first locked portion are engaged with each other.

Particularly, according to the sixth aspect, as a result of the first locking portion and the first locked portion engaging with each other, and the second locking portion and the second locked portion engaging with each other, the protector is interposed between the first locking portion and the second locking portion. Accordingly, the protector is less likely to deform even if a load is exerted thereon.

Particularly, according to the seventh aspect, the vertical wall portion is arranged so that the direction in which the interposed portions extend matches the direction in which the load is exerted, and thus the vertical wall portion is less likely to be crushed even if a load is exerted thereon.

Particularly, according to the eighth aspect, the load bearing wall portion includes a portion in which the hollow plate material is doubled, and thus the load bearing wall portion is even less likely to be crushed even if a load is exerted thereon.

Particularly, according to the ninth aspect, the load bearing wall portion is arranged so that the direction in which the interposed portions extend corresponds to a direction containing the direction in which a load is exerted, and thus the load bearing wall portion is less likely to be crushed even if a load is exerted thereon.

DESCRIPTION OF EMBODIMENTS

Embodiment

Figure 1:
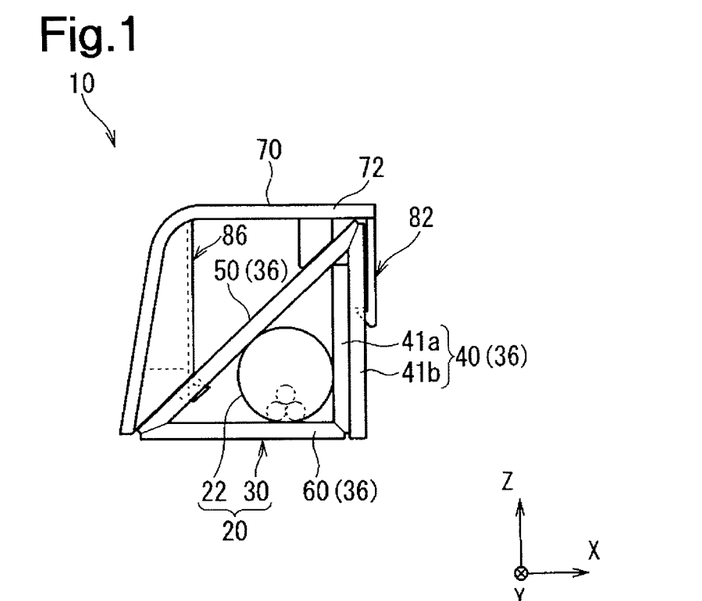
FIG. 1 is a front view illustrating a protector-equipped electric wire according to an embodiment, and an arrangement structure of the same.
Figure 2:
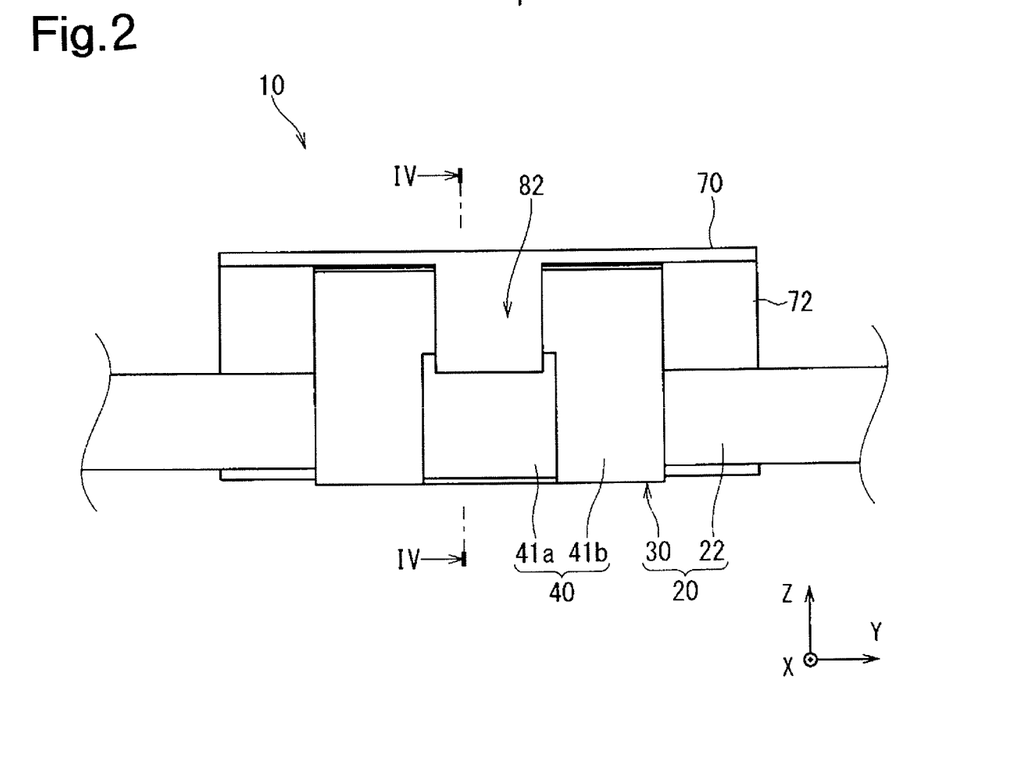
FIG. 2 is a side view illustrating the protector-equipped electric wire according to the embodiment, and the arrangement structure of the same.
Figures 3, 4:
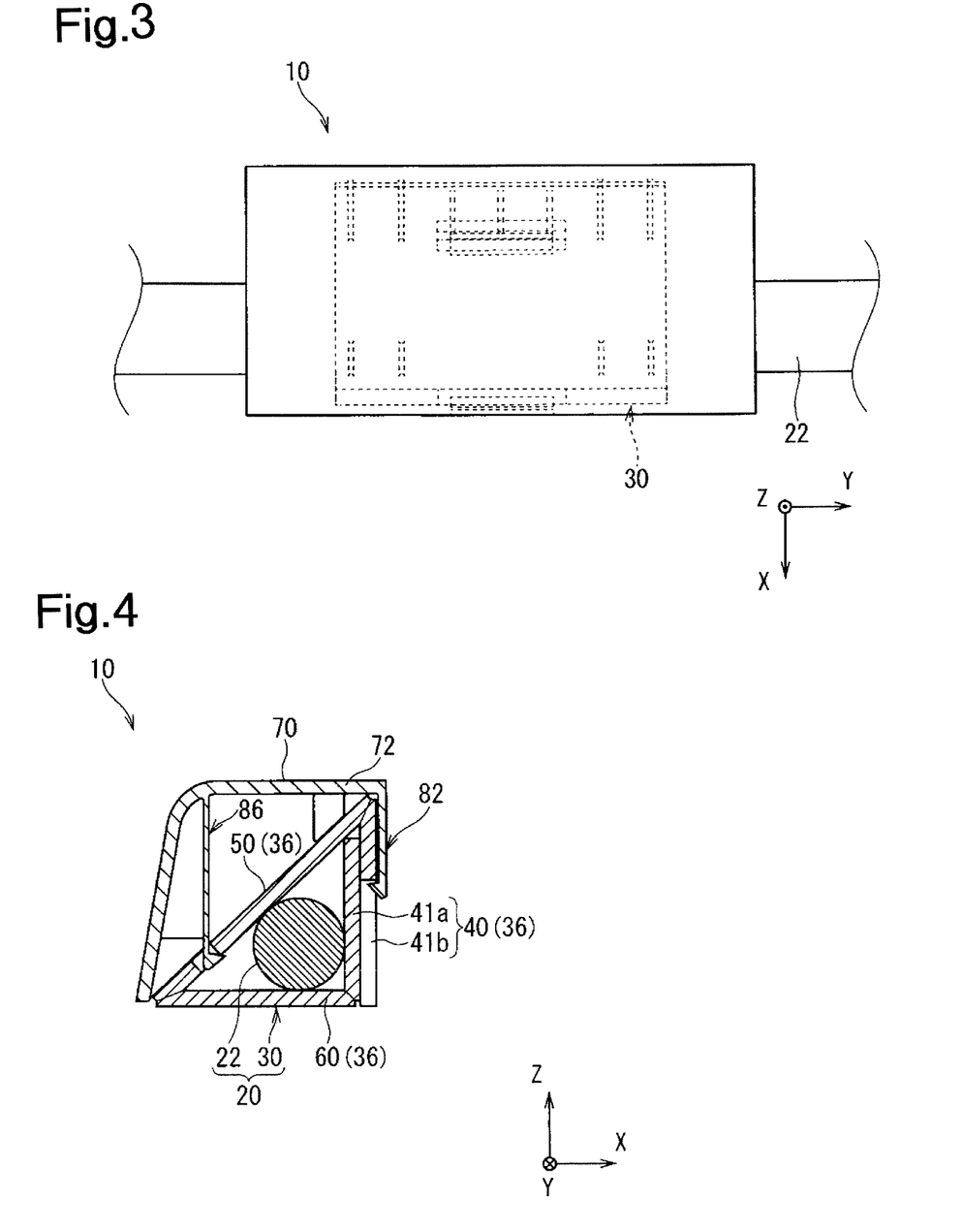
FIG. 3 is a plan view illustrating the protector-equipped electric wire according to the embodiment, and the arrangement structure of the same.
FIG. 4 is a cross-sectional view taken along a line IV-IV in FIG. 2.

Hereinafter, a protector-equipped electric wire according to an embodiment and an arrangement structure of the same will be described. FIG. 1 is a front view illustrating a protector-equipped electric wire according to the embodiment and an arrangement structure of the same. FIG. 2 is a side view illustrating the protector-equipped electric wire according to the embodiment and the arrangement structure of the same. FIG. 3 is a plan view illustrating the protector-equipped electric wire according to the embodiment and the arrangement structure of the same. FIG. 4 is a cross-sectional view taken along a line IV-IV in FIG. 2.

A protector-equipped electric wire 20 includes an electric wire 22 and a protector 30 externally fitted to the electric wire 22. A protector-equipped wire arrangement structure 10 is constituted by the protector-equipped electric wire 20 arranged at a position in a vehicle at which a load is exerted. Examples of the position in a vehicle at which a load is exerted include a position that a passenger may step on and a position at which something can be placed.

It is sufficient that at least one electric wire 22 is included. The present embodiment will describe a case in which the protector-equipped electric wire 20 includes a bundle of electric wires 22 including a plurality of electric wires 22. Each electric wire 22 is provided with, for example, a core wire and a covering provided around the core wire. The core wire is linear, and is made of a conductive material such as copper, a copper alloy, aluminum, or an aluminum alloy. Here, the core wire has a configuration in which a plurality of bar wires are twisted. Of course, the core wire may also be made of a single wire. The covering is formed by extruding an insulating resin material around the core wire using an extrusion device or the like. Connectors or the like are connected to ends of the electric wires 22. The electric wires 22, arranged at an arrangement destination in the vehicle or the like, are connected to various types of electric apparatuses installed in the vehicle via the connectors or the like. Thus, the electric wires 22 are used to electrically connect the various types of electric apparatuses to each other. Note here that the description will be given assuming that the plurality of electric wires 22 are put into a bundle, but there may be cases where the electric wires 22 are not bundled.

Figure 5:
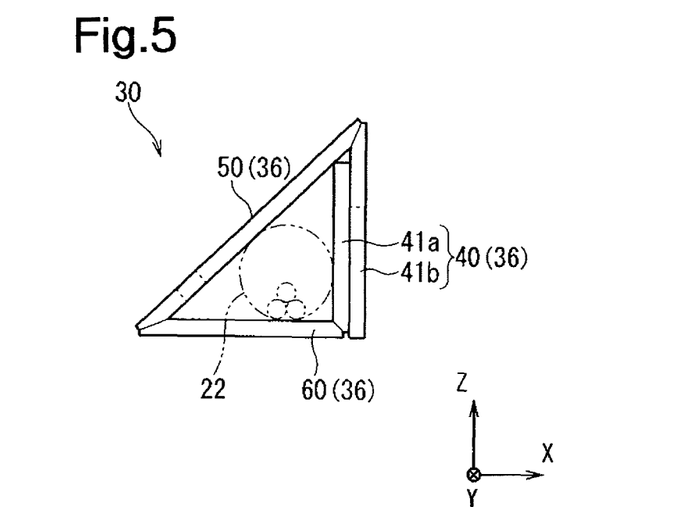
FIG. 5 is a front view illustrating a protector according to the embodiment.
Figure 6:
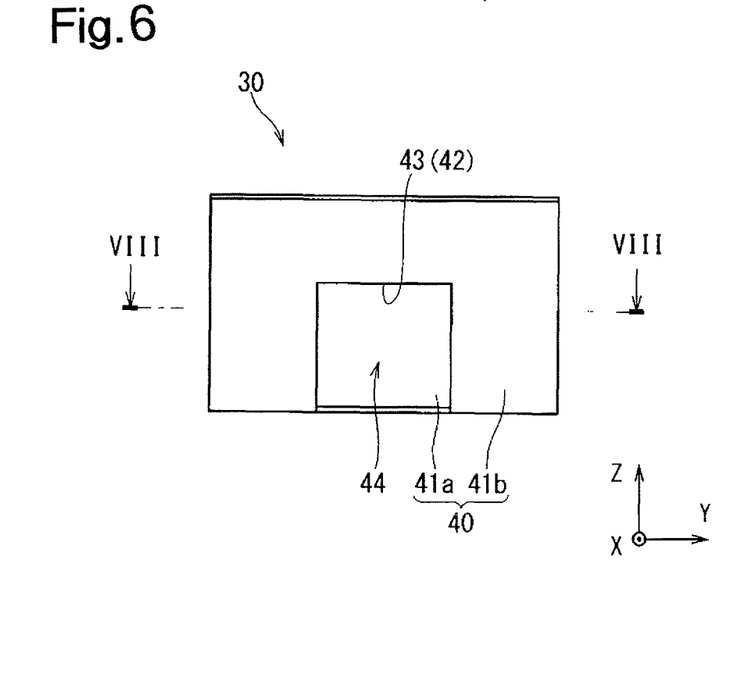
FIG. 6 is a side view illustrating the protector according to the embodiment.
Figure 7:
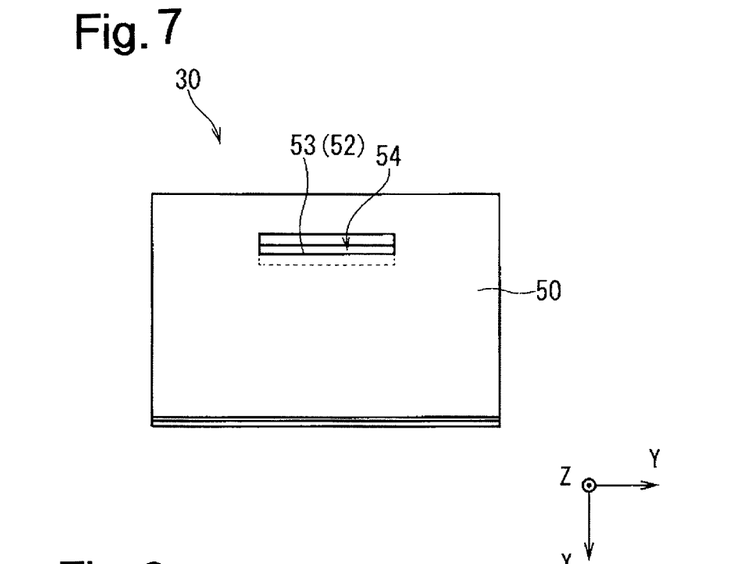
FIG. 7 is a plan view illustrating the protector according to the embodiment.
Figure 8:
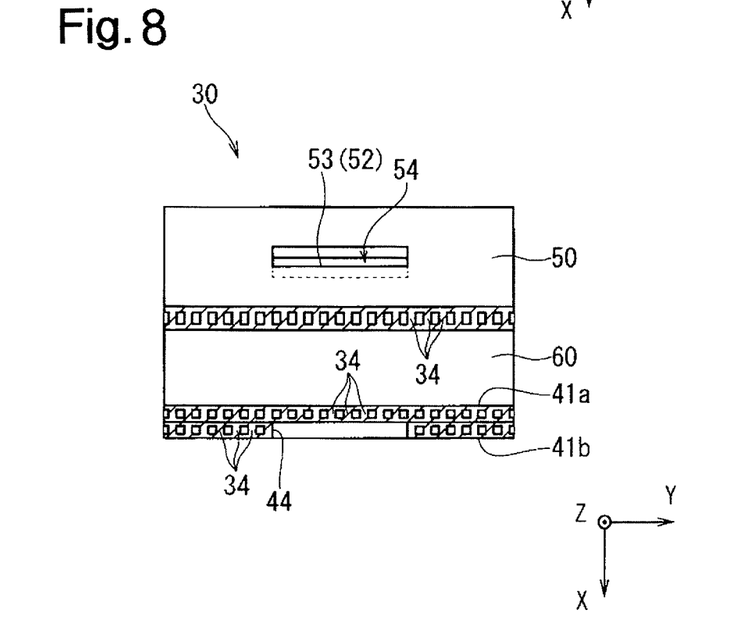
FIG. 8 is a cross-sectional view taken along a line VIII-VIII in FIG. 6.

The protector 30 will be described in detail with reference to, in addition to FIGS. 1 to 4, FIGS. 5 to 8. FIG. 5 is a front view illustrating the protector 30 according to the embodiment. FIG. 6 is a side view illustrating the protector 30 according to the embodiment. FIG. 7 is a plan view illustrating the protector 30 according to the embodiment. FIG. 8 is a cross-sectional view taken along a line VIII-VIII in FIG. 6.

Figure 9:
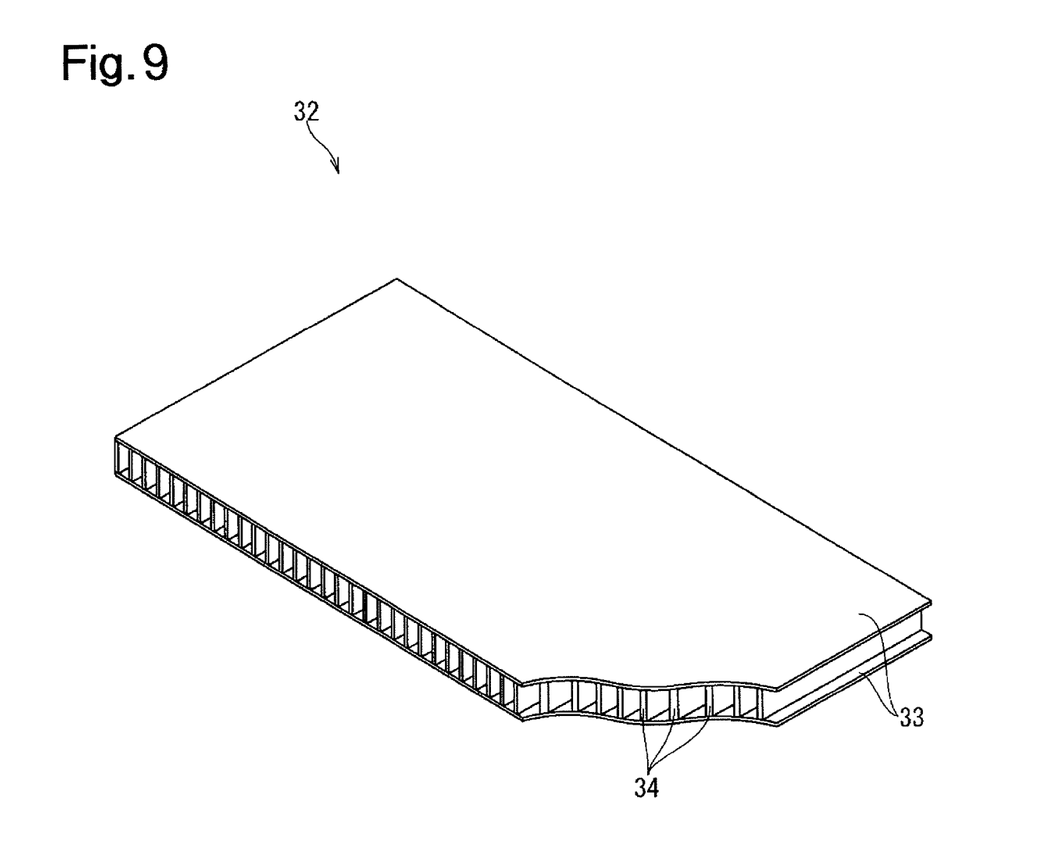
FIG. 9 is a perspective view illustrating a hollow plate material.

The protector 30 is made of a hollow plate material 32. The following will describe the hollow plate material 32 in detail with reference to FIG. 9. FIG. 9 is a perspective view illustrating the hollow plate material 32.

The hollow plate material 32 includes a plurality of (here, two) plate-shaped portions 33, and interposed portions 34 that are arranged between the plurality of plate-shaped portions 33 and form hollow spaces between the plurality of plate-shaped portions 33.

The constituent material of the plurality of plate-shaped portions 33 and the interposed portions 34 is not particularly limited. That is, the plurality of plate-shaped portions 33 and the interposed portions 34 may be made of paper, a resin, or a combination thereof. If at least one of the plurality of plate-shaped portions 33 and the interposed portions 34 is made of paper, it is preferable that the surface thereof be subjected to water-repellent processing or the like. It is conceivable that the hollow plate material 32 is a member made of a resin, for example.

The plate-shaped portions 33 are flat. The plurality of plate-shaped portions 33 are connected to each other and spaced apart by the interposed portions 34.

Here, a plurality of interposed portions 34 are provided between the plurality of plate-shaped portions 33 and are parallel to one another at intervals.

Each interposed portion 34 has the shape of an elongated plate, and is connected to the plate-shaped portions 33 on both sides, orthogonally to the plate-shaped portions 33.

Accordingly, when the hollow plate material 32 is cut along a surface that is orthogonal to a direction in which the interposed portions 34 extend, the cross section shows a ladder-structure in which the plurality of interposed portions 34 are parallel to one another between the pair of plate-shaped portions 33.

Such a hollow plate material 32 can be manufactured continuously using, for example, an extrusion molding device that extrudes a resin from extrusion holes that correspond to the ladder-structured cross section, and thus it is possible to manufacture the hollow plate material 32 easily and at a low cost. Alternatively, the hollow plate material 32 may also be manufactured by bonding the two plate-shaped portions 33 to both sides of the plurality of interposed portions 34 arranged in parallel to one another, by thermal welding or applying an adhesive, for example.

The plate material with a hollow structure is not limited to the above-described example. For example, the plate material may also have a configuration in which a succession of mountains and valleys in the shape of waves is interposed between a plurality of plate-shaped portions. Alternatively, the plate material may also have a configuration in which portions interposed between a plurality of plate-shaped portions form a hollow shape of polygonal columns such as triangular columns, particularly a honeycomb structure.

Of these plate materials having a hollow structure, a plate material made of a resin may be referred to as "corrugated plastic".

Employing the hollow plate material 32 as a material of the protector 30 can have the following advantages. That is, due to the plurality of interposed portions 34 arranged in parallel to one another at intervals, the hollow plate material 32 is unlikely to be bent in the direction in which the interposed portions 34 extend, but is likely to be bent in the direction in which the interposed portions 34 are arranged in parallel to one another. At this time, if a slit is formed in one plate-shaped portion 33 supporting the interposed portions 34, namely, a slit is formed in the part thereof that is not in contact with the interposed portions 34, along the direction in which the interposed portions 34 extend, then the hollow plate material 32 will be more likely to be bent using the part of the other plate-shaped portion 33 that is opposite to the slit as a fold line. Furthermore, the hollow plate material 32 has superior strength due to its structure that forms a hollow structure. Furthermore, the hollow plate material 32 is relatively lightweight for its strength since it has a hollow structure. Moreover, the amount of material used for the hollow plate material 32 is small for its strength. Accordingly, it is possible to reduce the material cost.

The protector 30 is made of the hollow plate material 32, which is folded. The protector 30 includes a plurality of wall portions 36 that cover the electric wires 22.

The plurality of wall portions 36 include at least one load bearing wall portion 40, 50. Here, the plurality of wall portions 36 include two load bearing wall portions 40 and 50 that are not parallel to each other. The load bearing wall portions 40 and 50 are provided so that the direction in which the interposed portions 34 extend corresponds to a direction containing a direction in which a load is exerted. The load bearing wall portions 40 and 50 include a vertical wall portion 40 arranged so that the direction in which the interposed portions 34 extend matches the direction in which a load is exerted. The load bearing wall portions 40 and 50 include a portion in which the hollow plate material 32 is doubled.

Specifically, the protector 30 has the shape of a triangular tube. Here, the protector 30 has a shape with a cross section of a right triangle. The wall portion 36 that constitutes the hypotenuse of the right triangle, and the wall portion 36 that constitutes another side of the right triangle respectively serve as the load bearing wall portions 40 and 50. Of the load bearing wall portions 40 and 50, the load bearing wall portion 40 that constitutes a side of the right triangle other than the hypotenuse serves as the vertical wall portion 40. Here, the vertical wall portion 40 includes the portion in which the hollow plate material 32 is doubled. Furthermore, the wall portion 36 that constitutes the remaining side of the right triangle serves as a bottom wall portion 60. Hereinafter, as shown in FIG. 1, the direction in which the bottom wall portion 60 of the right triangle extends refers to a "x-axis direction", two directions that are orthogonal to the x-axis direction and are orthogonal to each other refer to a "y-axis direction" and a "z-axis direction", and specifically, the "z-axis direction" is a direction in which the vertical wall portion 40 of the right triangle extends. In the following description, it is assumed that a load is exerted in the negative z-axis direction. Of course, a load may also be exerted in a direction slightly inclined with respect to the negative z-axis direction. Hereinafter, the description will be given assuming that the z-axis direction is equal to the vertical direction.

The bottom wall portion 60 is located on the negative side in the z-axis direction with respect to the vertical wall portion 40. In the vertical wall portion 40 in which the hollow plate material 32 is doubled, one hollow plate material 32 is contiguous to the bottom wall portion 60, and the other hollow plate material 32 is contiguous to the load bearing wall portion 50. Also, the other hollow plate material 32 is located on the outer side. That is, the vertical wall portion 40 includes an inner part 41*a* and an outer part 41*b*. The inner part 41*a* is contiguous to the bottom wall portion 60. The outer part 41*b* is contiguous to the load bearing wall portion 50.

The protector 30 is provided with a first locked portion 42 and a second locked portion 52. The first locked portion 42 and the second locked portion 52 will be described in detail later, together with a first locking portion 82 and a second locking portion 86.

Figure 10:
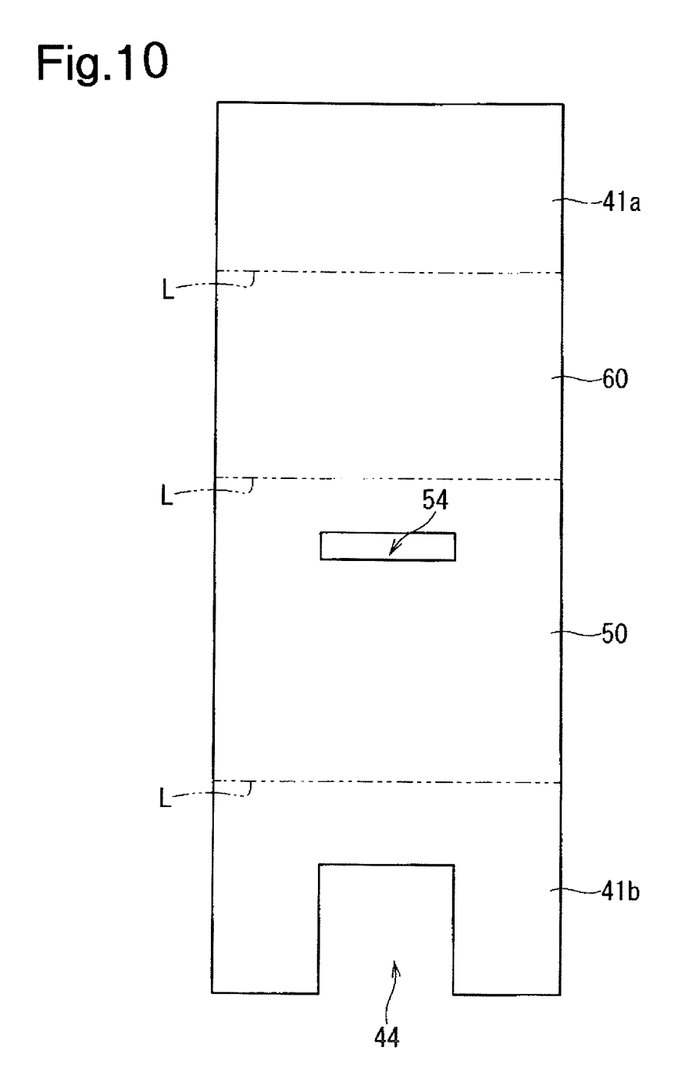
FIG. 10 is a diagram illustrating a state in which the protector according to the embodiment is developed.

To manufacture the protector 30 using the hollow plate material 32, the hollow plate material 32 is first cut into the shape that corresponds to the protector 30 as shown in FIG. 10. Then, the cut hollow plate material 32 is folded at predetermined positions. Note that a position at which the hollow plate material 32 is to be folded is preferably provided with a fold line L in advance before it is folded. In FIG. 10, fold lines L are indicated by phantom lines (dashed-two dotted lines). It is conceivable to make cuts in one plate-shaped portion 33 and the interposed portions 34 as the fold lines L, for example. Furthermore, it is conceivable to perform thermal pressing in a linear fashion to crush the interposed portions 34, for example.

As a result of the hollow plate material 32 being folded at the fold lines L, the protector 30 in the shape of a triangular tube is obtained. To keep the shape of a triangular tube, it is conceivable to wind a tape on, for example, the portion of the protector 30 that excludes catching portions 43 and 53, which will be described later. Of course, it is also possible to bond the outer surface of the inner part 41*a* and the inner surface of the outer part 41*b* to each other with a double-sided tape, an adhesive or the like. Furthermore, the protector 30 may also be provided with a catching structure such as a locking claw 84 and the catching portion 43, which will be described later.

Here, for arrangement of the protector-equipped electric wire 20, a restricting member 70 is attached to the protector-equipped electric wire 20. The restricting member 70 will be described in detail with reference to FIGS. 11 to 13.

Figure 11:
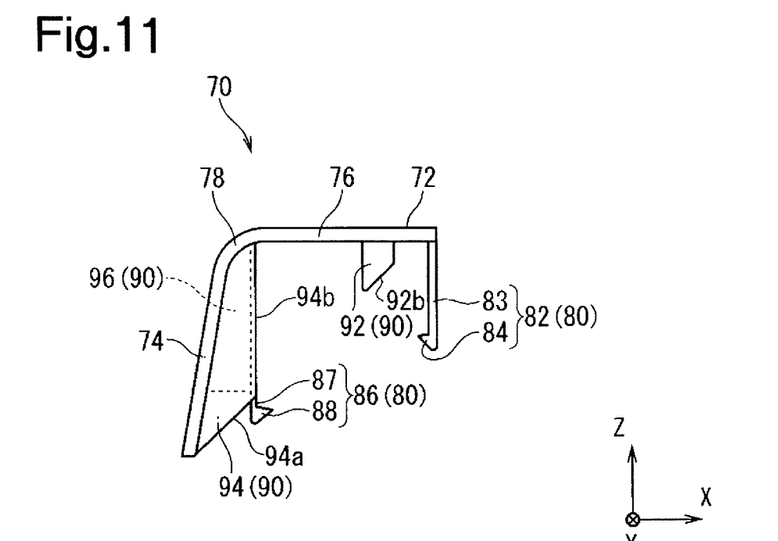
FIG. 11 is a front view illustrating an attachment member.
Figure 12:
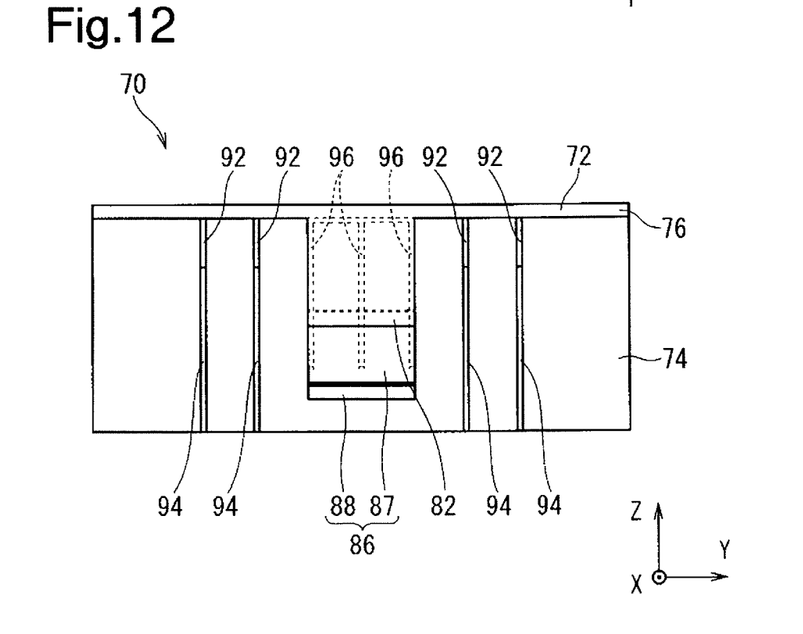
FIG. 12 is a side view illustrating the attachment member.
Figure 13:
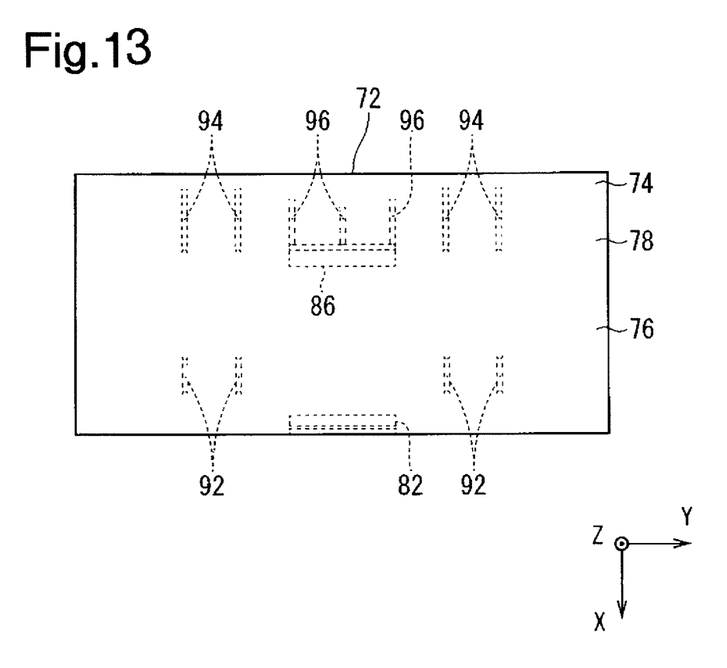
FIG. 13 is a plan view illustrating the attachment member.

The restricting member 70 is provided to cover the upper side of the protector-equipped electric wire 20. The restricting member 70 is provided with a main body portion 72, a locking portion 80, and ribs 90.

The main body portion 72 includes a first face portion 74 that extends while being slightly inclined from the z-axis direction in a cross section taken along the x-z plane; a second surface portion 76 that extends in the x-axis direction; and a coupling face portion 78 that gently couples the first face portion 74 and the second surface portion 76.

The locking portion 80 includes the first locking portion 82 and the second locking portion 86. The first locking portion 82 is provided so as to be able to engage with the first locked portion 42. The second locking portion 86 is provided so as to be able to engage with the second locked portion 52. The following will describe the lock structure between the first locking portion 82 and the first locked portion 42, and the lock structure between the second locking portion 86 and the second locked portion 52 in detail.

The first locking portion 82 protrudes at a position at which the protector 30 is arranged. Specifically, the first locking portion 82 is provided at the end of the second surface portion 76 that is opposite to the coupling face portion 78. The first locking portion 82 includes a base portion 83 that extends in the z-axis direction, and the locking claw 84 that protrudes from the tip of the base portion 83 to the negative side in the x-axis direction. The base portion 83 of the first locking portion 82 abuts against the outer surface of the outer part 41*b* that constitutes the vertical wall portion 40.

The vertical wall portion 40 is provided with the first locked portion 42 that is capable of engaging with the first locking portion 82. The first locked portion 42 is configured to be able to engage with the first locking portion 82 so that the vertical wall portion 40 is supported by the first locking portion 82 in the direction in which a load is exerted.

More specifically, the locking claw 84 of the first locking portion 82 is caught by the catching portion 43 of the first locked portion 42. The catching portion 43 is obtained by forming a recess 44 in the vertical wall portion 40. The recess 44 is formed so that an intermediate portion, in the y-axis direction, of the outer part 41*b* constituting the vertical wall portion 40 is recessed in the z-axis direction. Accordingly, the locking claw 84 is caught on the vertical wall portion 40 in the direction in which the interposed portions 34, and extends across the direction in which the interposed portions 34. Here, the locking claw 84 is caught in the z-axis direction while extending in the x-axis direction.

The second locking portion 86 protrudes at a position at which the protector 30 is arranged. The second locking portion 86 is provided so as to be able to sandwich the protector 30 together with the first locking portion 82. Specifically, the second locking portion 86 is provided on the coupling face portion 78 on the second surface portion 76 side. The second locking portion 86 includes a base portion 87 that extends in the z-axis direction, and a locking claw 88 that protrudes from the tip of the base portion 87 to the positive side in the x-axis direction. The second locking portion 86 engages with the second locked portion 52 provided in the load bearing wall portion 50. At this time, the second locking portion 86 engages with the second locked portion 52 on the load bearing wall portion 50 on the bottom wall portion 60 side. Accordingly, the first locking portion 82 is located on one side, in the x-axis direction, of the electric wires 22, and the second locking portion 86 is located on the other side. Furthermore, thus, the second locking portion 86 engages with the second locked portion 52 on the bottom wall portion 60 side relative to the first locking portion 82.

The second locked portion 52 is provided in the protector 30 on the side opposite to the first locked portion 42 with the electric wire 22 interposed therebetween. The second locked portion 52 includes a catching portion 53, which is obtained by forming a through hole 54 in the load bearing wall portion 50. Note that the through hole 54 is formed such that its axis direction matches the direction orthogonal to the main surfaces of the hollow plate material 32, but this is not essential. The through hole 54 may also be formed such that its axis direction matches a direction that intersects with the direction orthogonal to the main surfaces of the hollow plate material 32, that is, its axis direction matches the direction corresponding to the z-axis direction when the protector 30 is arranged, for example.

The locking claw 88 of the second locking portion 86 is caught by the catching portion 53 of the second locked portion 52. Accordingly, the locking claw 88 is caught on the load bearing wall portion 50 in a direction containing the direction in which the interposed portions 34 extend, and extends across the direction in which the interposed portions 34 extend. Here, the locking claw 88 is caught in z-axis direction while extending in the x-axis direction.

As described above, the lock structure in which the locking claw 84 (88) is caught in a direction containing the direction in which the interposed portions 34 extend, and extends across the direction in which the interposed portions 34 extend is considered as being advantageous when the hollow plate material 32 is fastened. That is, the present embodiment has been described as being applicable to a protector-equipped electric wire as including an electric wire arranged at a position at which a load is exerted, and a protector externally fitted to the electric wire, the protector being formed of a folded hollow plate material, the hollow plate material including a plurality of plate-shaped portions and interposed portions that are arranged extending in one direction between the plurality of plate-shaped portions and form hollow spaces between the plurality of plate-shaped portions, the protector including a plurality of wall portions that cover the electric wire, the plurality of wall portions including at least one load bearing wall portion that is arranged so that the direction in which the interposed portions extend corresponds to a direction containing a direction in which the load is exerted, but the present invention may also be applicable to a protector-equipped electric wire using another hollow plate material.

That is, the lock structure can be used to fasten a first member including the locking claw 84 (88) and a second member including the catching portion 43 (53) by which the locking claw 84 (88) is caught. In this case, the first member may be different from the second member or the same member as the second member. Examples of the case where the first member and the second member are different members may include a case where, similar to the foregoing case, the second member is a protector and the first member is a counterpart member for fixing the protector. Furthermore, examples of the case where the first member and the second member are the same members may include a case where, when the first portion is fastened to the second portion to keep the hollow plate material 32 folded in the tubular shape for example, the first portion includes the locking claw 84 (88) and the second portion includes the catching portion 43 (53).

The ribs 90 include first ribs 92, second ribs 94, and third ribs 96.

The first ribs 92 are provided, extending from the second surface portion 76 in the z-axis direction. As shown in FIG. 11, the first ribs 92 are provided in a space, in the x-axis direction, of the second surface portion 76 that is between the first locking portion 82 and the second locking portion 86. As shown in FIG. 12, two first ribs 92 are provided in the y-axis direction on each of the sides of the first locking portion 82 (second locking portion 86). Each first rib 92 has a front end surface 92a in the shape that corresponds to the outer surface of the load bearing wall portion 50, and presses the load bearing wall portion 50 on the vertical wall portion 40 side.

The second ribs 94 are provided as shown in FIG. 11, expanding from the first face portion 74 and the coupling face portion 78 to the inner circumferential side. As shown in FIG. 12, the second ribs 94 are provided at the same positions, in the y-axis direction, as those of the first ribs 92. Each second rib 94 has a front end surface 94a that extends in the z-axis direction in the shape that corresponds to the outer surface of the load bearing wall portion 50, and presses the load bearing wall portion 50 on the bottom wall portion 60 side. The second rib 94 has a front end surface 94b that protrudes in the x-axis direction to the position on the inner surface of the base portion 87 of the second locking portion 86.

The first ribs 92 and the second ribs 94 are provided to press the protector 30. Accordingly, the load bearing wall portion 50 is suppressed from rotating with respect to the bottom wall portion 60 in the direction away from the bottom wall portion 60, which thus makes the protector 30 unlikely to deform. Note that the first ribs 92 and the second ribs 94 may abut against the protector 30 before a load is exerted in the state in which the protector 30 is attached to the restricting member 70, or may abut against the protector 30 once a load is exerted to deform the protector 30 or the restricting member 70 slightly.

The third ribs 96 are provided to couple the outer surface of the base portion 87 of the second locking portion 86 to the main body portion 72. As shown in FIG. 12, the third ribs 96 are respectively provided at three positions that include positions at two ends, in the y-axis direction, of the second locking portion 86 and a position therebetween. By providing the third ribs 96, the rigidity of the second locking portion 86 is improved.

Operation

The following will describe the operation when a load is exerted on the protector-equipped wire arrangement structure 10.

If a load is exerted in the z-axis direction on the outer surface side of the restricting member 70 (outer surface side of the second surface portion 76), the load is dispersed and at least part thereof is exerted on the protector 30. Here, part of the load is exerted on the vertical wall portion 40 via the second surface portion 76 and is exerted on the load bearing wall portion 50 via the first ribs 92 and the second ribs 94.

Here, the vertical wall portion 40 is arranged so that the direction in which the interposed portions 34 extend matches the direction in which the load is exerted, and thus is unlikely to bend even if a load is exerted thereon. In this case, it is conceivable that, even if the vertical wall portion 40 is deformed, the deformation is suppressed to one in which its intermediate portion is slightly warped. Also, if the vertical wall portion 40 is deformed in the negative z-axis direction, a reactive force in the positive z-axis direction is exerted from the locking claw 84 of the first locking portion 82 to the catching portion 43 of the first locked portion 42. That is, the locking claw 84 is caught in the z-axis direction. However, this direction matches the direction in which the interposed portions 34 extend, and thus the portion of the vertical wall portion 40 that is on the positive side, in the z-axis direction, with respect to the catching portion 43 is unlikely to deform. The same applies to the second locking portion 86 and the second locked portion 52. In contrast, if the interposed portion 34 extends in the y-axis direction, the portion of the vertical wall portion 40 that is on the positive side, in the z-axis direction, with respect to the catching portion 43 has, in its intermediate portion, a position in which no interposed portion 34 is partially present, and thus the stress is concentrated on the plate-shaped portion 33 at that position, and thus the vertical wall portion 40 is likely to bend.

Furthermore, the load bearing wall portion 50 is arranged so that the direction in which the interposed portions 34 extend corresponds to a direction containing the direction in which a load is exerted, and thus is unlikely to bend even if a load is exerted thereon. Furthermore, a load is exerted at positions on the load bearing wall portion 50 that are in the vicinity of the bottom wall portion 60 and in the vicinity of the vertical wall portion 40, and thus the load bearing wall portion 50 is supported by the bottom wall portion 60 and the vertical wall portion 40, thus making the load bearing wall portion 50 unlikely to bend. In this case, it is conceivable that, even if the load bearing wall portion 50 is deformed, the deformation is suppressed to one in which its intermediate portion is slightly warped.

Furthermore, such deformation that the vertical wall portion and the load bearing wall portion 50 are rotated around the connection portions with the bottom wall portion 60 can be suppressed, by sandwiching them with the two locking portions 80. Particularly, such deformation that the load bearing wall portion 50 is rotated in a direction in which it approaches the bottom wall portion 60 around the connection portion with the bottom wall portion 60 can efficiently be suppressed, by pressing the outer surface of the vertical wall portion 40 using the base portion 83 of the first locking portion 82. Furthermore, such deformation that the load bearing wall portion 50 is rotated in a direction in which it moves away from the bottom wall portion 60 around the connection portion with the bottom wall portion 60 can efficiently be suppressed, by pressing the outer surface of the load bearing wall portion 50 using the first ribs 92 and the second ribs 94.

According to the protector-equipped electric wire 20 and the protector-equipped wire arrangement structure 10 of the present embodiment, the load bearing wall portions 40 and 50 are arranged so that the directions in which the interposed portions 34 extend correspond to directions including the direction in which a load is exerted, and thus the load bearing wall portions 40 and 50 are less likely to be crushed even if a load is exerted thereon. This makes the protector 30 less likely to be crushed.

Furthermore, it is possible to support a load using the two load bearing wall portions 40 and 50 that are not parallel to each other. Particularly, since the protector 30 has the shape of a triangular tube, such deformation that the load bearing wall portions 40 and 50 are rotated is less likely to occur even if a load is exerted. This makes the protector 30 less likely to be crushed.

As a result of the first locking portion 82 and the first locked portion 42 engaging with each other, the vertical wall portion 40 is supported by the first locking portion 82. Accordingly, even if a load is exerted, the vertical wall portion 40 is even less likely to be crushed. Since the first locked portion 42 includes the catching portion 43 to which the locking claw 84 of the first locking portion 82 is caught on the vertical wall portion 40 in the direction in which the interposed portions 34 extend, and extends across the direction in which the interposed portions 34 extend, the deformation of the protector 30 is suppressed by a force exerted as a result of the first locking portion 82 and the first locked portion 42 engaging with each other. More specifically, even if, in a state in which the first locking portion 82 and the first locked portion 42 are engaged with each other, a force is exerted in the direction of the lock, the interposed portions extend in the direction in which the force is exerted, the same cross section of the vertical wall portion 40 is contiguous in the direction in which the force is exerted, and the stress is unlikely to be concentrated on the intermediate portion of the vertical wall portion 40. This suppresses the vertical wall portion 40 from being folded midway.

As a result of the first locking portion 82 and the first locked portion 42 engaging with each other and the second locking portion 86 and the second locked portion 52 engaging with each other, the protector 30 is interposed between the first locking portion 82 and the second locking portion 86. Accordingly, the protector 30 is unlikely to deform even if a load is exerted thereon.

Since the vertical wall portion 40 is arranged so that the direction in which the interposed portions 34 extend matches the direction in which a load is exerted, the vertical wall portion 40 is less likely to be crushed even if a load is exerted thereon.

Since the vertical wall portion 40 includes a portion in which the hollow plate material 32 is doubled, the vertical wall portion 40 is even less likely to be crushed even if a load is exerted thereon.

Modification

In the present embodiment, the description has been given assuming that the protector 30 has the shape of a triangular tube, but it is not essential. The protector 30 may also have another tubular shape such as the shape of a square tube. If the protector has the shape of a square tube, it is conceivable that the protector is trapezoidal with a right angle, and a wall portion that corresponds to a side with right angles at its ends serves as a vertical wall portion. If the protector is trapezoidal with a right angle, it is preferable to provide a wall portion constituting at least one of a pair of parallel sides with, on the outer side thereof, a support surface extending along the wall portion. Of course, the protector 30 may also have another shape other than a tubular shape, such as L-shape or U-shape.

Furthermore, although the description has been given assuming that the protector-equipped wire arrangement structure 10 is provided with the restricting member 70, this is not essential. The protector-equipped electric wire 20 may also be arranged directly without using a restricting member.

Note that the configurations described in the foregoing embodiment and the modifications may be combined with each other as appropriately as long as they are not inconsistency with respect to each other.

The present invention has been described in detail as described above, but the description above is exemplary in all respects, and the present invention is not limited to those. A number of modifications that are not exemplified are possible without departing from the scope of the present invention.

LIST OF REFERENCE NUMERALS

10 Protector-equipped wire arrangement structure
20 Protector-equipped electric wire
22 Electric wire
30 Protector
32 Hollow plate material
33 Plate-shaped portion
34 Interposed portion
36 Wall portion
40 Vertical wall portion (load bearing wall portion)
42 First locked portion
43 Catching portion
50 Load bearing wall portion
52 Second locked portion
53 Catching portion
60 Bottom wall portion
70 Attachment member
72 Main body portion
82 First locking portion
83 Base portion
84 Locking claw
86 Second locking portion
87 Base portion
88 Locking claw
92 First rib
94 Second rib
96 Third rib
L Fold line

The invention claimed is:

1. A protector-equipped electric wire comprising:
an electric wire arranged at a position at which a load is exerted; and
a protector externally fitted to the electric wire,
wherein the protector is made of a folded hollow plate material, the hollow plate material including
a plurality of plate-shaped portions, and
interposed portions that are arranged extending in one direction parallel to the plurality of plate-shaped portions between the plurality of plate-shaped portions and form hollow spaces between the plurality of plate-shaped portions,
the protector including a plurality of wall portions formed by the hollow plate material and that covers the electric wire,
the plurality of wall portions includes at least one load bearing wall portion that is arranged so that the one direction in which the interposed portions extend inside the at least one load bearing wall portion corresponds to a direction in which the load is exerted on the at least one load bearing wall portion, and
the protector is tubular, and is provided with a locked structure configured to engage with a locking structure that protrudes from a counterpart structure provided at a position at which the protector is arranged.

2. The protector-equipped electric wire according to claim 1,
wherein the protector has a shape of a triangular tube.

3. The protector-equipped electric wire according to claim 1,
wherein the load bearing wall portion is provided with a first locked structure configured to engage with a first locking structure that protrudes from the counterpart structure at a position at which the protector is arranged, and
the first locked structure engaging with the first locking structure so that the load bearing wall portion is supported by the first locking structure in the direction in which the load is exerted on the at least one load bearing wall portion.

4. The protector-equipped electric wire according to claim 3,
wherein the first locked structure includes a catch portion in which a locking claw of the first locking structure is caught on the load bearing wall portion in the one direction in which the interposed portions extend, and the locking claw extends across the one direction in which the interposed portions extend.

5. The protector-equipped electric wire according to claim 3,
wherein the protector is provided with a second locked structure located on a side opposite to the first locked structure with the electric wire interposed between the first locked structure and the second locked structure, and
the second locked structure is configured to engage with a second locking structure that protrudes from the counterpart structure at a position at which the protector is arranged and can sandwich the protector together with the first locking structure.

6. The protector-equipped electric wire according to claim 1,
wherein the load bearing wall portion includes a vertical wall portion that is arranged so that the one direction in which the interposed portions extend matches the direction in which the load is exerted on the at least one load bearing wall portion.

7. The protector-equipped electric wire according to claim 1,
wherein the load bearing wall portion includes a portion in which the hollow plate material is doubled.

8. A protector-equipped wire arrangement structure comprising:
a protector-equipped electric wire including an electric wire and a protector externally fitted to the electric wire and arranged at a position at which a load is exerted,
wherein the protector is made of a folded hollow plate material, the hollow plate material including
a plurality of plate-shaped portions, and
interposed portions that are arranged extending in one direction parallel to the plurality of plate-shaped portions between the plurality of plate-shaped portions and form hollow spaces between the plurality of plate-shaped portions,
the protector including a plurality of wall portions formed by the hollow plate material and that covers the electric wire,
the plurality of wall portions includes at least one load bearing wall portion that is arranged so that the one direction in which the interposed portions extend inside the at least one load bearing wall portion corresponds to a direction in which the load is exerted on the at least one load bearing wall portion, and
the protector is tubular, and is provided with a locked structure configured to engage with a locking structure that protrudes from a counterpart structure provided at a position at which the protector is arranged.

* * * * *